2,928,854

ALKATRIENOIC ACID COMPOUND

William A. Bolhofer, Frederick, Pa., assignor to Merck & Co., Inc., Rahway, N.J., a corporation of New Jersey No Drawing. Application February 26, 1957
Serial No. 642,391

3 Claims. (Cl. 260—413)

This invention relates to a novel composition of matter and to a method for preparing it. In particular, the invention relates to 3-hydroxy-3,7,11-trimethyl-4,6,10-dodecatrienoic acid having the structural formula:

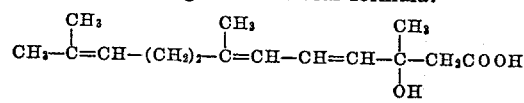

as well as to the alkali metal and alkaline earth metal salts thereof.

3-hydroxy-3,7,11-trimethyl-4,6,10-dodecatrienoic acid has been found to inhibit the biosynthesis of cholesterol in liver homogenates in vitro and accordingly the acid and its salts which, in vivo, would hydrolyze to the free acid, are potentially useful in lowering blood cholesterol levels in humans which is considered an important function of chemotherpeutic agents for the treatment of atherosclerosis.

The 3-hydroxy-3,7,11-trimethyl-4,6,10-dodecatrienoic acid of this invention and its salts can be prepared by various methods. A process which has been found to be particularly well adapted to the preparation of these compounds is the Reformatsky reaction which employs readily available intermediates which can be reacted with a minimum of difficulty. This process comprises reacting an alpha haloacetate, such as a lower alkyl chloro-bromo- or iodoacetate with pseudoionone in the presence of zinc.

The reaction is preferably carried out in the presence of an anhydrous organic solvent which is non-reactive with the reactants, such as anhydrous benzene, ethyl ether, butyl ether, toluene, xylene or mixtures thereof and at room temperature. The reaction, if desired, also can be initiated by the addition of a catalytic amount of iodine, amalgamated zinc or methylmagnesium-iodide and the yields improved by heating, preferably under reflux conditions, after the exothermic reaction between the reactants has subsided.

The intermediate zinc compound formed by the Reformatsky reaction is hydrolyzed by the addition of dilute acid, preferably a dilute mineral acid, and the ester thus formed extracted or separated from the organic layer by distillation. Saponification of the ester with a base selected from an alkali metal or alkaline earth metal base forms the corresponding salt which can be hydrolyzed to the free acid.

Alternatively, the alkali metal or alkaline earth metal salts can be prepared by known methods such as by neutralizing the free acid with the selected base, converting a water soluble salt, such as a sodium salt, to an insoluble salt by reaction with, e.g. calcium chloride, and the like.

The preparation of these compounds is more fully described in the following examples. It is to be understood, however, that the examples are illustrative of the method employed for their preparation and are not to be construed as limiting the invention to the particular reaction conditions specifically described.

*Example 1.—3-hydroxy-3,7,11-trimethyl-4,6,10-dodecatrienoic acid*

Pseudoionone (96 g., 0.5 mole), ethyl bromoacetate (110 g., 0.65 mole) and activated zinc (50 g.) were allowed to react by the standard Reformatsky procedure (Chemical Reactions, vol. 1, p. 1, John Wiley & Sons) in 300 ml. of refluxing benzene. After addition of all the reagents and a refluxing time of two hours, the reaction mixture was cooled to room temperature and poured into ice water (300 ml.) containing glacial acetic acid (50 ml.). The benzene phase was separated and washed successively with water, saturated sodium bicarbonate solution and water. Drying of the benzene solution was effected with anhydrous sodium sulfate after which the benzene was removed by evaporation under reduced pressure. The product was a reddish oil weighing 148 g. For purification, the oil was distilled at 130° C. at 0.1 mm. in a short path still. The distillate having $n_D^{25}$ of 1.4950 was pure ethyl 3-hydroxy-3,7,11-trimethyl-4,6,10-dodecatrienoate.

Analysis for $C_{17}H_{28}O_3$—
  Calculated: C, 72.82; H, 10.06;
  Found: C, 72.68; H, 9.96.

A solution of the ethyl ester (9.6 g.) in 90% ethyl alcohol (50 ml.) containing potassium hydroxide (2.1 g., mole eq.+10%) was allowed to stand at room temperature for 60 hours in a flask from which the air had been flushed with nitrogen. The alcohol then was removed from the solution of the potassium salt by vacuum concentration and about 30 ml. of water was added to the aqueous residue. Non-saponified material was extracted from the alkaline solution with three 50 ml. portions of ether. Acidification of the aqueous solution with dilute hydrochloric acid yielded the free acid in the form of an oil which was extracted with ether. The ethereal extract was washed successively with water, saturated sodium bicarbonate solution and water and then dried over anhydrous sodium sulfate. Removal of the solvent in vacuo at 25° C. yielded 3-hydroxy-3,7,11-trimethyl-4,6,10-dodecatrienoic acid as an oil weighing 6.9 g. and having $n_D^{25}$ of 1.5148.

*Example 2.—Sodium salt of 3-hydroxy-3,7,11-trimethyl-4,6,10-dodecatrienoic acid*

Sodium hydroxide solution was added with stirring to a mixture of 3-hydroxy-3,7,11-trimethyl-4,6,10-dodecatrienoic acid in water until all of the oil dissolved in the form of the sodium salt which can be isolated by evaporation of the water.

*Example 3.—Calcium salt of 3-hydroxy-3,7,11-trimethyl-4,6,10-dodecatrienoic acid*

Calcium chloride was added slowly and with stirring at about 40° C. to an aqueous solution of the sodium salt obtained as described in Example 2, thus precipitating the insoluble calcium salt which is separted by filtration.

While the above examples describe the preparation of certain specific compounds, it is to be understood that the invention is not limited by these examples or by the specific reaction conditions described for the preparation of the compounds, but is understood to embrace variations and modifications falling within the scope of the appended claims.

What is claimed is:
1. A compound selected from the group consisting of 3-hydroxy-3,7,11-trimethyl-4,6,10-dodecatrienoic acid and the alkali metal and the alkaline earth metal salts thereof.
2. 3-hydroxy-3,7,11-trimethyl-4,6,10-dodecatrienoic acid.
3. Calcium salt of 3-hydroxy-3,7,11-trimethyl-4,6,10-dodecatrienoic acid.

References Cited in the file of this patent

Chemical Abstracts, vol. 26 (1932), p. 2731[1], article entitled "Synthesis of Methylpseudoionones of Definite Structure," Cherbuliez et al.

Chemical Abstracts, vol. 49 (1955), p. 8199[1], article entitled "Synthesis of Polyenes IV, " Oroshnik et al.

Chemical Abstracts, vol. 44 (1950), p. 5332[6], article entitled "Sequisterpenes and Azulenes XC," Caliezi et al.

Textbook of Organic Chemistry, third edition, by Richter (1952), p. 327.